United States Patent
Guenther et al.

(10) Patent No.: US 11,753,728 B2
(45) Date of Patent: Sep. 12, 2023

(54) ANTIWEAR-COATED METAL COMPONENT, IN PARTICULAR FOR A BALL VALVE, AND METHOD FOR APPLYING A MULTI-LAYER ANTIWEAR COATING IN ORDER TO PRODUCE A COMPONENT OF THIS TYPE

(71) Applicant: Robert Bosch GmbH, Stuttgart (DE)

(72) Inventors: Marcus Guenther, Gerlingen (DE); Richard Braak, Stuttgart (DE); Gerald Schuetze, Marbach (DE); Michael Fraune, Stuttgart (DE)

(73) Assignee: Robert Bosch GmbH

( * ) Notice: Subject to any disclaimer, the term of this patent is extended or adjusted under 35 U.S.C. 154(b) by 165 days.

(21) Appl. No.: 16/975,834

(22) PCT Filed: Jan. 7, 2019

(86) PCT No.: PCT/EP2019/050236
§ 371 (c)(1),
(2) Date: Aug. 26, 2020

(87) PCT Pub. No.: WO2019/161981
PCT Pub. Date: Aug. 29, 2019

(65) Prior Publication Data
US 2020/0407856 A1   Dec. 31, 2020

(30) Foreign Application Priority Data
Feb. 26, 2018   (DE) ............ 10 2018 202 842.7

(51) Int. Cl.
*C23C 28/00*   (2006.01)
*F16K 25/04*   (2006.01)
(Continued)

(52) U.S. Cl.
CPC .......... *C23C 28/347* (2013.01); *C23C 28/322* (2013.01); *C23C 28/341* (2013.01);
(Continued)

(58) Field of Classification Search
CPC ............ F02M 61/166; F02M 63/0077; F02M 2200/9038; F02M 2200/9046; F02M 61/1886; F16K 25/005; F16K 25/05
(Continued)

(56) References Cited

U.S. PATENT DOCUMENTS

| | | | |
|---|---|---|---|
| 2005/0242156 A1 | 11/2005 | Jabs et al. | |
| 2007/0224349 A1* | 9/2007 | Hosenfeldt | ........... C23C 14/024 |
| | | | 428/688 |
| 2011/0091701 A1* | 4/2011 | Endrino | .............. C23C 28/3455 |
| | | | 428/212 |

FOREIGN PATENT DOCUMENTS

| | | |
|---|---|---|
| CN | 101010442 A | 8/2007 |
| CN | 105590635 A | 5/2016 |

(Continued)

OTHER PUBLICATIONS

English Machine Translation of WO 2010/012704, first published in German in Feb. 2010, 3 pages. (Year: 2010).*
(Continued)

*Primary Examiner* — Mahmoud Gimie
(74) *Attorney, Agent, or Firm* — Michael Best & Friedrich LLP

(57) ABSTRACT

The invention relates to an antiwear-coated metal component (1), in particular for a ball valve (6), the tribosurface of which component is at least partially provided with a multi-layer antiwear coating (2). The antiwear coating (2) has at least a metal adhesion layer (3*a*), an adhesion-promoting layer (3*b*) and at least one first cover layer (3*c*). The adhesion-promoting layer (3*b*) comprises a carbide-forming metal or a boride-forming metal. The at least first cover layer (3*c*) comprises a hydrogen-free tetrahedral carbon. The invention further relates to a method for applying an antiwear coating (2) to a metal substrate (9) in order to produce an antiwear-coated metal component (1) of this (Continued)

type. The invention further relates to a ball valve, comprising an antiwear-coated metal component (1) of this type and an antiwear coating (2).

20 Claims, 2 Drawing Sheets

(51) Int. Cl.
*F16K 25/00* (2006.01)
*F02M 63/00* (2006.01)
*F02M 61/16* (2006.01)
*F02M 61/18* (2006.01)

(52) U.S. Cl.
CPC ............ *C23C 28/343* (2013.01); *C23C 28/36* (2013.01); *F02M 61/166* (2013.01); *F02M 61/1886* (2013.01); *F02M 63/0077* (2013.01); *F16K 25/005* (2013.01); *F16K 25/04* (2013.01); *F02M 2200/9038* (2013.01); *F02M 2200/9046* (2013.01)

(58) Field of Classification Search
USPC ................................... 251/315.03
See application file for complete search history.

(56) References Cited

FOREIGN PATENT DOCUMENTS

| DE | 10038954 | | 2/2002 | |
| DE | 10355030 A1 | * | 6/2005 | ........... F02M 59/462 |
| DE | 102008040766 | | 2/2010 | |
| DE | 102017109452 | | 11/2017 | |
| JP | 2009504448 A | * | 2/2009 | ......... C23C 16/0273 |
| NO | 2010012704 | | 2/2010 | |
| WO | 2017148582 | | 9/2017 | |
| WO | 2017186915 | | 11/2017 | |

OTHER PUBLICATIONS

JP2009504448A (Feb. 5, 2009), (machine translation) (Year: 2009).*
DE10355030A1 (Van Der et al.), (Jun. 23, 2005) (machine translation) (Year: 2005).*
International Search Report for Application No. PCT/EP2019/050236 dated Mar. 28, 2019 (English Translation, 3 pages).
Voevodin, A. et al., "Design of a Ti/TiC/DLC functionally gradient coating based on studies of structural transitions in Ti—C thin films," Thin Solid Films, vol. 298, No. 1-2, Apr. 20, 1997, pp. 107-115.

* cited by examiner

ANTIWEAR-COATED METAL COMPONENT, IN PARTICULAR FOR A BALL VALVE, AND METHOD FOR APPLYING A MULTI-LAYER ANTIWEAR COATING IN ORDER TO PRODUCE A COMPONENT OF THIS TYPE

BACKGROUND OF THE INVENTION

The invention relates to an antiwear-coated metallic component, in particular for a ball valve, whose tribologically stressed surface is provided at least partly with a multilayer antiwear layer. The invention further relates to a process for applying an antiwear layer to a metallic substrate in order to produce such a component. In addition, the invention relates to a ball valve comprising such a component.

DE 10 2008 040 766 A1 discloses an antiwear layer arrangement, in particular for components of a fuel injection system which are subjected to high pressures and temperatures. The antiwear layer arrangement has a protective layer formed by tetragonally bound amorphous carbon or comprising a proportion of tetragonally bound amorphous carbon. Furthermore, the antiwear layer arrangement comprises a first bonding agent layer formed by chromium or comprising a proportion of chromium. In addition, the antiwear layer arrangement comprises at least one second bonding agent layer which adjoins the first bonding agent layer and comprises a proportion of carbon.

SUMMARY OF THE INVENTION

Proceeding from the abovementioned prior art, it is an object of the present invention to develop an antiwear-coated metallic component and a process for applying a multilayer antiwear layer in order to produce such a component further, and in particular to improve adhesion between the individual layers of the antiwear layer, with thermal and mechanical stressability of the component also being increased.

An antiwear-coated metallic component according to the invention for an injection valve has a multilayer antiwear layer on its tribologically stressed surface, with the antiwear layer comprising at least one metallic bonding layer, a bonding agent layer and at least one first covering layer, wherein the bonding agent layer comprises a carbide-forming hydrogen-free metal or a boride-forming metal and wherein the at least first covering layer comprises a hydrogen-free tetrahedral carbon. The antiwear layer is built up in such a way that thermally stable adhesion of the individual layers to one another is achieved and a high resistance to tribological stresses is thus produced. The metallic bonding layer preferably has a layer thickness in the range from 10 nm to 1 μm and consists of a metal selected from the group consisting of titanium, chromium, molybdenum, tungsten, vanadium, hafnium, tantalum, zirconium and combinations thereof. Further metals and also further combinations thereof are also conceivable.

The bonding agent layer preferably has a layer thickness in the range from 10 nm to 10 μm, preferably a layer thickness of less than 1 μm, and consists of a metal selected from the group consisting of silicon carbide SiC, tungsten carbide WC, vanadium carbide VC, tantalum carbide TaC, hafnium carbide HfC, zirconium carbide ZrC, molybdenum carbide MoC, titanium carbide TiC, titanium boride TiB, titanium diboride $TiB_2$ and combinations thereof. If the bonding agent layer comprises a hydrogen-free carbide-forming metal, the bonding agent layer comprising the hydrogen-free carbide-forming metal then has a stoichiometric ratio of metal to carbon of 1:1. However, the ratio between metal and carbon can also be in a ratio range from 10:1 to 1:3. When the bonding agent layer comprises a boride-forming metal, the bonding agent layer preferably comprises titanium in order to form a chemically inert, boron-containing titanium layer or a titanium boride layer. The bonding agent layer comprising the boride-forming metal preferably has a stoichiometric ratio between metal and boron of 1:2, with a titanium diboride being present in this case. The ratio between metal and boron can, however, also be in a ratio range from 10:1 to 1:10. It is advantageous that the boron-containing bonding agent layer acts as diffusion barrier, as a result of which oxidation or contamination of the substrate or the individual constituents of the coating by thermal diffusion is prevented. Furthermore, there is comparatively stable and secure bonding of the bonding agent layer to the first covering layer because of the chemical and structural similarity of titanium boride and titanium carbide.

The first covering layer preferably has a layer thickness in the range from 0.1 μm to 10 μm. The first covering layer of the antiwear layer is preferably a hydrogen-free tetrahedral carbon layer (ta-C) which compared to the metallic bonding layer and the bonding agent layer has a high thermal stability even at temperatures above 600° C. The metallic bonding layer and the bonding agent layer are provided essentially to realize a better gradient in the E modulus and/or the hardness between a substrate, i.e. the base material of the component being coated, and the first covering layer. An eggshell effect of the antiwear layer is thus countered by the layers having good adhesion. The antiwear layer, consisting of at least the bonding layer, the bonding agent layer and the first covering layer, thus displays comparatively good adhesion even at high operating temperatures and in the presence of aggressive oxidizing gas atmospheres. This has, in particular, a positive effect on the resistance of the antiwear layer and thus on the life of the antiwear-coated metallic component.

In a preferred illustrative embodiment, the antiwear layer comprises a first gradient layer formed between the metallic bonding layer and the bonding agent layer in order to produce a concentration gradient between the metallic bonding layer and the bonding agent layer, where the first gradient layer comprises a metal and has a layer thickness in the range from 1 nm to 10 μm. The first gradient layer preferably comprises a boride-forming metal, with the boride-forming metal being in particular a titanium boride or a titanium diboride. In other words, the proportion of boron preferably increases with increasing layer thickness within the first gradient layer. As an alternative, the first gradient layer comprises a carbide-forming metal, where the carbide-forming metal is selected from the group consisting of silicon carbide, tungsten carbide, vanadium carbide, tantalum carbide, hafnium carbide, zirconium carbide, molybdenum carbide, titanium carbide and combinations thereof. In other words, the proportion of carbon preferably increases with increasing layer thickness within the first gradient layer.

In a further preferred illustrative embodiment, the antiwear layer comprises a second gradient layer formed between the bonding agent layer and the first covering layer in order to produce a concentration gradient between the bonding agent layer and the first covering layer, where the second gradient layer comprises a hydrogen-free tetrahedral carbon. In other words, the proportion of carbon preferably increases within the second gradient layer. It is conceivable for either the first gradient layer between the metallic bonding layer and the bonding agent layer or the second gradient layer between the bonding agent layer and the first covering layer to be present. The antiwear layer then has four individually applied layers. However, it is also possible to provide both a first and a second gradient layer respectively between the metallic bonding layer, the bonding agent layer and the first covering layer. In this case, the antiwear layer has five separately applied layers. The gradient in the E modulus and/or hardness is realized more uniformly by the first and/or second gradient layer and the adhesion of the antiwear layer is thus improved.

The antiwear layer preferably additionally has a second covering layer which comprises an amorphous hydrogen-containing carbon, with the second covering layer being arranged at least partly on the first covering layer. In other words, the second covering layer is a running-in layer composed of amorphous hydrogen-containing carbon (a-C:H) which serves to smooth the technical surface at the beginning of tribological contact.

In a process according to the invention for applying an antiwear layer to a metallic substrate in order to produce an antiwear-coated metallic component, in particular for an injection valve, the substrate is firstly provided, a metallic bonding layer is applied to at least part of the substrate by means of a plasma coating process, in particular with a layer thickness in the range from 10 nm to 1 µm, with a bonding agent layer comprising a hydrogen-free carbide-forming metal or a boride-forming metal being applied to at least part of the metallic bonding layer by means of a plasma coating process, in particular with a layer thickness in the range from 10 nm to 10 µm, preferably with a layer thickness of less than 1 µm, and with a first covering layer comprising a hydrogen-free tetrahedral carbon being applied to at least part of the bonding agent layer by means of a plasma coating process, in particular with a layer thickness in the range from 0.1 µm to 10 µm. The individual layers of the antiwear layer are preferably applied to the substrate of the component by means of a physical vapor deposition process. In the physical vapor deposition process, a starting material is brought into the gas phase with the aid of physical methods and subsequently conveyed to the substrate to be coated, where it condenses and forms the respective layer.

The application of the metallic bonding layer to the substrate is preferably carried out by means of magnetron sputtering, with the respective layer material being sputtered directly from a target material in a noble gas atmosphere, for example in an argon, neon, krypton or xenon atmosphere. Further preference is given to the sputtering of the layer material in order to produce the metallic bonding layer preferably being carried out by means of high-energy impulse magnetron sputtering (HiPIMS) in combination with a bias voltage, as a result of which a comparatively dense metallic bonding layer is formed from the sputtered ions. Both DC voltages and also pulsed bias voltages can be used for applying the bonding agent layer, with the bonding agent layer preferably being deposited directly with a stoichiometric composition from the respective target material. The bias voltage is in the range up to 10 kV, preferably from 0.1 to 2 kV. In the case of a carbide-containing bonding agent layer, reactive deposition can, as an alternative, also be carried out by addition of carbon-containing gases.

The first covering layer, consisting of the amorphous tetrahedral carbon (ta-C), is preferably produced by means of vacuum arc vaporization of a carbon target. The carbon ions formed here are accelerated by means of a preferably pulsed bias voltage to the component and there form the first covering layer having the respective layer thickness. In a preferred illustrative embodiment, the bias voltage is selected in such a way that the average ion energy of the carbon ions is in the range from 40 to 100 eV.

The invention encompasses the teaching that a first and/or second gradient layer is formed between the metallic bonding layer and the bonding agent layer and/or between the bonding agent layer and the first covering layer in order to produce a concentration gradient between the metallic bonding layer and the bonding agent layer and/or between the bonding agent layer and the first covering layer, where the first and/or second gradient layer is likewise formed by means of a plasma coating process and has a layer thickness in the range from 1 nm to 10 µm. The first and/or second gradient layer is preferably applied by means of PVD processes, particularly preferably by means of vacuum arc vaporization, to the metallic bonding layer and/or the bonding agent layer.

Preference is given to a second covering layer being applied to at least part of the first covering layer by means of a PECVD process with a layer thickness in the range from 0.1 µm to 10 µm, where the second covering layer comprises an amorphous hydrogen-containing carbon. In plasma enhanced chemical vapor deposition (PECVD), the deposition of the second covering layer is effected by means of a plasma discharge in a hydrocarbon-containing gas, which forms predominantly ions and only a small amount of free radicals and to which a noble gas, for example argon, neon, krypton, has preferably been added. The ions produced by means of the hydrocarbon-containing gas, for example by means of isobutane, isobutene or methane, are subsequently accelerated by means of a pulsed bias voltage to the surface of the component to be coated and there form an a-C:H layer.

The layer thicknesses indicated above are preferably produced by means of plasma coating by application of the material continuing until the respective desired layer thickness has been reached. During or after plasma coating, the applied layer thickness is monitored by means of layer thickness testing.

The antiwear-coated metallic component is preferably used in injection technology for injection valves, in particular for high-pressure applications of hydraulic valves or pneumatic valves. The antiwear-coated metallic component is particularly preferably used in a ball valve, where the ball valve comprises a spherical counterbody which is made to rest tightly against the antiwear-coated metallic component. The antiwear-coated metallic component has, in particular, a seat having the shape of an internal cone for accommodating at least part of the counterbody, with at least the seat having the shape of an internal cone having an antiwear layer. The seat having the shape of an internal cone advantageously has an opening angle of less than 90°, preferably of 60°. As an alternative, other metallic components can also have such an antiwear layer, with these metallic components being subjected, in particular, to tribological wear stresses. For example, needle valves, pump pistons, valve parts or sliding bearing shells can accordingly have antiwear-coated components.

BRIEF DESCRIPTION OF THE DRAWINGS

Three preferred illustrative embodiments of the invention are described in more detail below with the aid of four figures. The figures here show.

DETAILED DESCRIPTION

Figure 1:
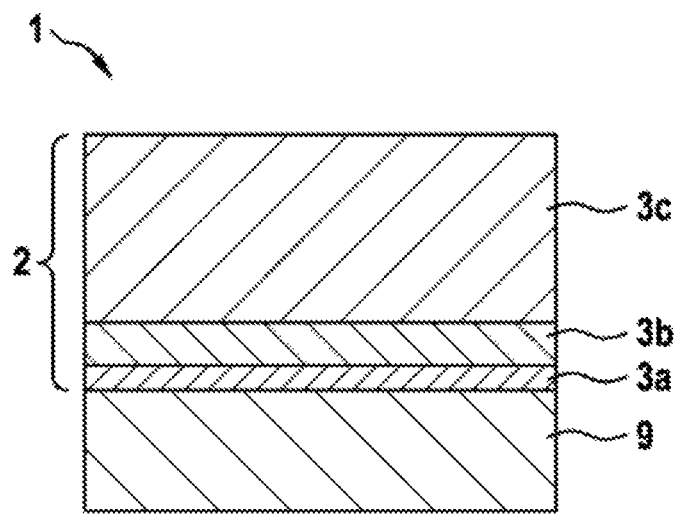
FIG. 1 a detailed sectional view of a metallic component according to the invention in order to illustrate a layer structure of an antiwear layer according to a first embodiment, FIG. 2 a detailed sectional view of the metallic component in order to illustrate the layer structure of the antiwear layer according to a second embodiment, FIG. 3 a detailed sectional view of the metallic component in order to illustrate the layer structure of the antiwear layer according to a third embodiment, and FIG. 4 a simplified schematic sectional view of a ball valve with the inventive antiwear-coated metallic component according to FIG. 3.
Figure 2:
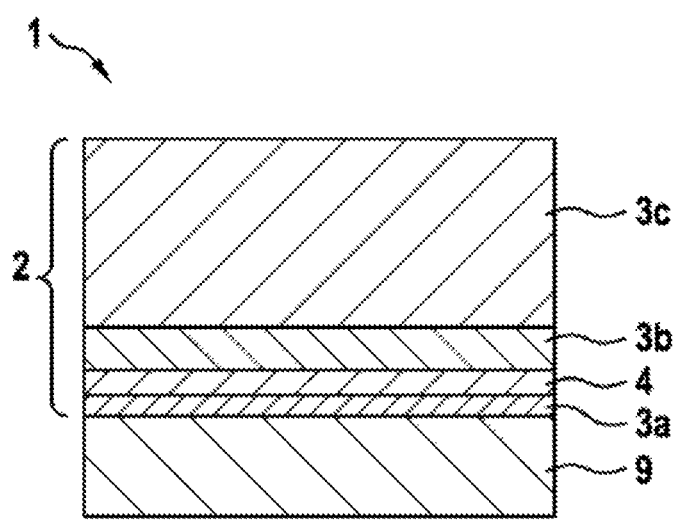
Figure 3:
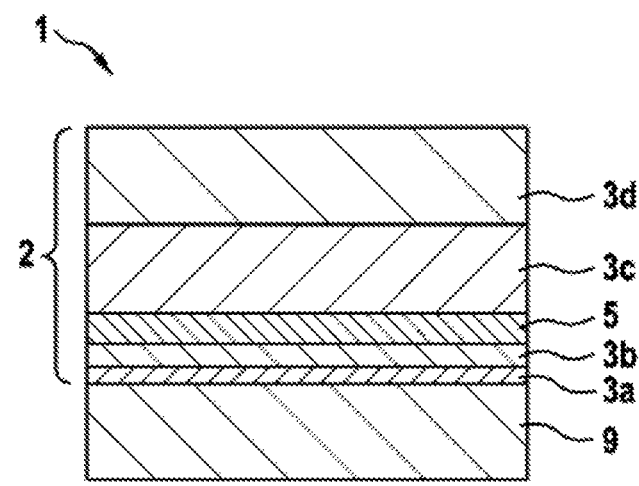

FIGS. 1 to 3 depict three illustrative embodiments of an antiwear-coated metallic component 1. The metallic component 1 provided with an antiwear layer 2 is in the present case used in a ball valve 6 depicted in more detail in FIG. 4, with, in particular, the wear of the tribologically stressed component 1 being reduced by the antiwear layer 2.

In FIG. 1, the antiwear layer 2 according to the first embodiment comprises a metallic bonding layer 3a, a bonding agent layer 3b and a first covering layer 3c, with the bonding agent layer 3b comprising a carbide-forming hydrogen-free metal and the first covering layer 3c comprising a hydrogen-free tetrahedral carbon. In the present case, the metallic bonding layer 3a, the bonding agent layer 3b and the first covering layer 3c have each been produced by means of a PVD process, for example by means of magnetron sputtering or vacuum arc vaporization. The metallic bonding layer 3a is applied over the full area of a substrate 9 of the component 1. The bonding agent layer 3b is subsequently applied over the full area of the metallic bonding layer 3a and finally coated over its full area with the first covering layer 3c, where the first covering layer has a layer thickness of 1 μm.

The metallic bonding layer 3a comprises titanium as layer material and has a layer thickness of 100 nm. The bonding agent layer 3b, or carbidic hard material layer, has a layer thickness of 200 nm and comprises, in the first embodiment, a titanium carbide, where the stoichiometric ratio of carbon to metal in the titanium carbide is 1:1, so that a stable and comparatively well-adhering bonding agent layer 3b is formed. As an alternative, a stoichiometric ratio between carbon and metal in the titanium carbide can also be selected in a range from 3:1 to 1:10. The first covering layer 3c protects the component 1 against wear and, in particular, reduces the coefficient of friction between the component 1 and a counterbody which tribologically stresses the component.

The antiwear layer 2 of the second embodiment depicted in FIG. 2 comprises a metallic bonding layer 3a, a bonding agent layer 3b and a first covering layer 3c, with a first gradient layer 4 being arranged between the metallic bonding layer 3a and the bonding agent layer 3b in order to produce a concentration gradient between the metallic bonding layer 3a and the bonding agent layer 3b. In the present case, the bonding agent layer 3b comprises a boride-forming metal and the first covering layer 3c comprises a hydrogen-free tetrahedral carbon. The metallic bonding layer 3a, the first gradient layer 4, the bonding agent layer 3b and the first covering layer 3c are each produced by means of a PVD process, for example by means of magnetron sputtering or vacuum arc vaporization. The metallic bonding layer 3a has been applied over the full area of a substrate 9 of the component 1. The first gradient layer 4 is subsequently applied to the metallic bonding layer 3a. In a further step, the bonding agent layer 3b is applied over the full area of the first gradient layer 4 and finally coated over its full area with the first covering layer 3c, where the first covering layer has a layer thickness of 1 μm.

The metallic bonding layer 3a in the present case comprises titanium as layer material and has a layer thickness of 100 nm. The bonding agent layer 3b has a layer thickness of 200 nm and comprises, in the second embodiment, a titanium boride, where the stoichiometric ratio between metal and boron in the titanium boride is 1:2, so that a stable and comparatively strongly adhering bonding agent layer 3b is formed. As an alternative, a stoichiometric ratio between titanium and boron in the titanium boride can also be selected in a range from 10:1 to 1:10. The first gradient layer 4 likewise comprises titanium boride as layer material, with the concentration of boron increasing linearly with increasing layer thickness of the first gradient layer 4 from the metallic bonding layer 3a to the bonding agent layer 3b. In the present case, the first gradient layer 4 has a layer thickness of 50 nm. The first covering layer 3c protects the component 1 against wear and, in particular, decreases the coefficient of friction between the component 1 and a counterbody which tribologically stresses the component. Good bonding of the first covering layer 3c to the substrate 9 is thus realized by the chemical and structural similarity of the layers.

FIG. 3 depicts the third embodiment of the metallic component 1, in which the antiwear layer 2 comprises a metallic bonding layer 3a, a bonding agent layer 3b and a first covering layer 3c. A second gradient layer 5 is arranged between the bonding agent layer 3b and the first covering layer 3c in order to produce a concentration gradient between the bonding agent layer 3b and the first covering layer. In the present case, the bonding agent layer 3b comprises a carbide-forming metal and the first covering layer 3c comprises a hydrogen-free tetrahedral carbon. As an alternative or in addition, the bonding agent layer 3b can also comprise a boride-forming metal. The metallic bonding layer 3a, the bonding agent layer 3b, the second gradient layer 5 and also the first covering layer 3c are each produced by means of a PVD process, for example by means of magnetron sputtering or vacuum arc vaporization. The metallic bonding layer 3a has been applied over the full area of a substrate 9 of the component 1. In a further step, the bonding agent layer 3b is applied over the full area of the metallic bonding layer 3a. The second gradient layer 5 is subsequently applied to the bonding agent layer 3b and finally coated over its full area with the first covering layer 3c, where the first covering layer has a layer thickness of 1 μm. In addition, the antiwear layer 2 additionally has a second covering layer 3d which is applied on top of the first covering layer 3c and in the present case has a layer thickness of likewise 1 μm. The second covering layer is in the present case produced by means of a PECVD process.

The metallic bonding layer 3a in the present case comprises titanium as layer material and has a layer thickness of 100 nm. The bonding agent layer 3b has a layer thickness of 200 nm and in the third embodiment comprises a titanium carbide and forms a stable and comparatively strongly adhering bonding agent layer 3b. As an alternative, a titanium boride can also be provided as bonding agent layer 3b. The second gradient layer 5 comprises a hydrogen-free tetrahedral carbon as layer material, with the concentration of the carbon increasing linearly with increasing layer thickness of the second gradient layer 5 from the bonding agent layer 3b to the first covering layer 3c. In the present case, the second gradient layer 5 has a layer thickness of 50 nm. The second covering layer 3d comprises an amorphous hydrogen-containing carbon as layer material. The first and second covering layers 3c, 3d protect the component 1 against wear and in particular reduce the coefficient of friction between the component 1 and a counterbody 7 which tribologically stresses the component 1. A firmly seated and strongly adhering bond of the first and second covering layer 3c, 3d to the substrate 9 is thus realized by the chemical and structural similarity of the layers.

Figure 4:
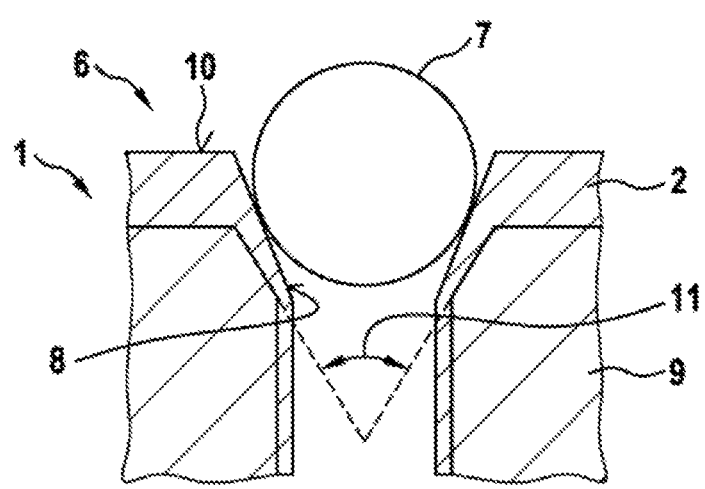

According to FIG. 4, a ball valve 6 comprises an antiwear-coated metallic component 1 as per FIG. 3 and a spherical counterbody 7. The counterbody 7 is provided to rest tightly against the antiwear-coated metallic component 1, with a surface 10 of the component 1 being tribologically stressed by the counterbody 7, especially at a seat 8 having the shape of an internal cone. The seat 8 having the shape of an internal cone serves to partly accommodate the counterbody 7 and in the present case has an opening angle 11 of 60°. The antiwear-coated metallic component 1 has, on the surface 10, an antiwear layer 2 applied to a substrate 9 of the component 1 as shown in FIG. 3 in order to reduce wear in the seal region between the counterbody 7 and the seat 8 having the shape of an internal cone by means of the stable and strongly adhering antiwear layer 2 and thus increase the life of the ball valve.

What is claimed is:

1. An antiwear-coated metallic component (1) having a tribologically stressed surface (10) provided at least partly with a multilayer antiwear layer (2), with the antiwear layer (2) comprising at least one metallic bonding layer (3a), a bonding agent layer (3b) and at least one first covering layer (3c), wherein the bonding agent layer (3b) comprises silicon carbide or a boride-forming metal, and wherein the at least first covering layer (3c) comprises a hydrogen-free tetrahedral carbon;
wherein the antiwear layer (2) comprises a first gradient layer (4) which is formed between the metallic bonding layer (3a) and the bonding agent layer (3b) in order to produce a concentration gradient between the metallic bonding layer (3a) and the bonding agent layer (3b), wherein the first gradient layer (4) comprises a metal and has a layer thickness in a range from 1 nm to 10 μm.

2. The antiwear-coated metallic component (1) as claimed in claim 1, characterized in that the metallic bonding layer (3a) has a layer thickness in a range from 10 nm to 1 μm and consists of a metal selected from the group consisting of titanium, chromium, molybdenum, tungsten, vanadium, hafnium, tantalum, zirconium and combinations thereof.

3. The antiwear-coated metallic component (1) as claimed claim 1, characterized in that the bonding agent layer (3b) has a layer thickness in a range from 10 nm to 10 μm selected from the group consisting of silicon carbide, titanium boride, titanium diboride and combinations thereof.

4. The antiwear-coated metallic component (1) as claimed in claim 1, characterized in that the first covering layer (3c) has a layer thickness in a range from 0.1 μm to 10 μm.

5. The antiwear-coated metallic component (1) as claimed in claim 1, characterized in that the first gradient layer (4) comprises a boride-forming metal.

6. The antiwear-coated metallic component (1) as claimed in claim 1, characterized in that the first gradient layer (4) comprises a carbide-forming metal, wherein the carbide-forming metal is selected from the group consisting of silicon carbide, tungsten carbide, vanadium carbide, tantalum carbide, hafnium carbide, zirconium carbide, molybdenum carbide, titanium carbide and combinations thereof.

7. The antiwear-coated metallic component (1) as claimed in claim 1, characterized in that the antiwear layer (2) comprises a second gradient layer (5) which is formed between the bonding agent layer (3b) and the first covering layer (3c) in order to produce a concentration gradient between the bonding agent layer (3b) and the first covering layer (3c),
wherein the second gradient layer (5) comprises a hydrogen-free tetrahedral carbon and has a layer thickness in a range from 1 nm to 10 μm.

8. The antiwear-coated metallic component (1) as claimed in claim 1, characterized in that the antiwear layer (2) further comprises a second covering layer (3d) comprising an amorphous hydrogen-containing carbon, wherein the second covering layer (3d) is arranged on at least part of the first covering layer (3c).

9. A process for producing an antiwear-coated metallic component (1) as claimed in claim 1 by applying a multi-layer antiwear layer (2) which comprises at least one metallic bonding layer (3a), a bonding agent layer (3b) and at least one first covering layer (3c) and is applied to a metallic substrate (9), wherein the process comprises the following steps:
provision of substrate (9);
application of the metallic bonding layer (3a) over at least part of the substrate (9) by means of a plasma coating process;
application of the bonding agent layer (3b) comprising silicon carbide or a boride-forming metal over at least part of the metallic bonding layer (3a) by means of a plasma coating process; and
application of the first covering layer (3c) comprising a hydrogen-free tetrahedral carbon over at least part of the bonding agent layer (3b) by means of a plasma coating process.

10. The process as claimed in claim 9, characterized in that the metallic bonding layer (3a) is applied with a layer thickness in a range from 10 nm to 1 μm.

11. The process as claimed in claim 9, characterized in that the bonding agent layer (3b) comprising silicon carbide or a boride-forming metal is applied with a layer thickness in a range from 10 nm to 10 μm.

12. The process as claimed in claim 9, characterized in that the first covering layer (3c) comprising a hydrogen-free tetrahedral carbon is applied with a layer thickness in a range from 0.1 μm to 10 μm.

13. The process as claimed in claim 9, characterized in that at least one gradient layer (4, 5) is formed in order to produce a concentration gradient between the metallic bonding layer (3a) and the bonding agent layer (3b) and/or between the bonding agent layer (3b) and the first covering layer (3c), wherein the respective gradient layer (4, 5) is formed by means of a plasma coating process and in a layer thickness in a range from 1 nm to 10 μm.

14. The process as claimed in claim 9, characterized in that a second covering layer (3d) is applied over at least part of the first covering layer (3c) by means of a PECVD process and in a layer thickness in a range from 0.1 μm to 10 μm, wherein the second covering layer (3d) comprises an amorphous hydrogen-containing carbon.

15. A valve (6) comprising an antiwear-coated metallic component (1) as claimed in claim 1 and also a counterbody (7) configured to rest tightly against the antiwear-coated metallic component (1), with the antiwear-coated metallic component (1) having a seat (8) for at least partly accommodating the counterbody (7).

16. The valve (6) as claimed in claim 15 which is configured as a ball valve which comprises a spherical counterbody (7) which corresponds to a seat (8) which has the shape of an internal cone and is provided with the antiwear layer (2).

17. An injection valve comprising an antiwear-coated metallic component (1) having a tribologically stressed surface (10) provided at least partly with a multilayer antiwear layer (2), with the antiwear layer (2) comprising at least one metallic bonding layer (3a), a bonding agent layer (3b) and at least one first covering layer (3c), wherein the bonding agent layer (3b) comprises silicon carbide or a boride-forming metal, and wherein the at least first covering layer (3c) comprises a hydrogen-free tetrahedral carbon;

wherein the antiwear layer (2) comprises a first gradient layer (4) which is formed between the metallic bonding layer (3a) and the bonding agent layer (3b) in order to produce a concentration gradient between the metallic bonding layer (3a) and the bonding agent layer (3b), wherein the first gradient layer (4) comprises a metal and has a layer thickness in a range from 1 nm to 10 µm.

18. The antiwear-coated metallic component (1) as claimed claim 1, characterized in that the bonding agent layer (3b) has a layer thickness less than 10 µm, and consists of a metal selected from the group consisting of silicon carbide, titanium boride, titanium diboride and combinations thereof.

19. The antiwear-coated metallic component (1) as claimed in claim 1, characterized in that the first gradient layer (4) comprises a boride-forming metal, wherein the boride forming metal is a titanium boride and/or titanium diboride.

20. The process as claimed in claim 9, characterized in that the bonding agent layer (3b) comprising silicon carbide or a boride-forming metal is applied with a layer thickness of less than 1 µm.

* * * * *